June 1, 1943.  A. A. HIRST  2,320,519
APPARATUS FOR GRAVITY SEPARATION OF GRANULAR MATERIAL
Filed Jan. 7, 1941   3 Sheets-Sheet 1
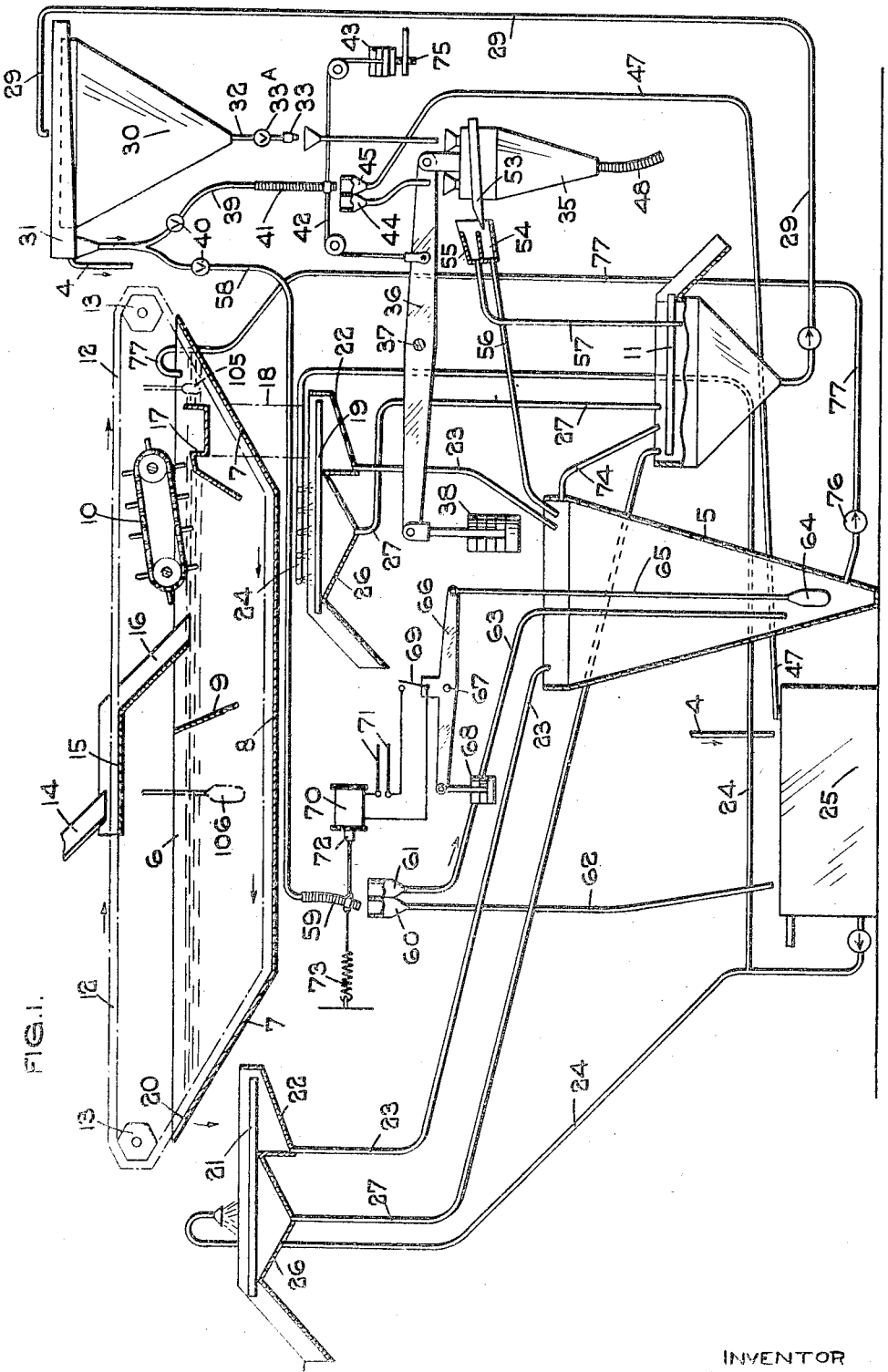
INVENTOR
ARTHUR A. HIRST
BY
ATTORNEYS

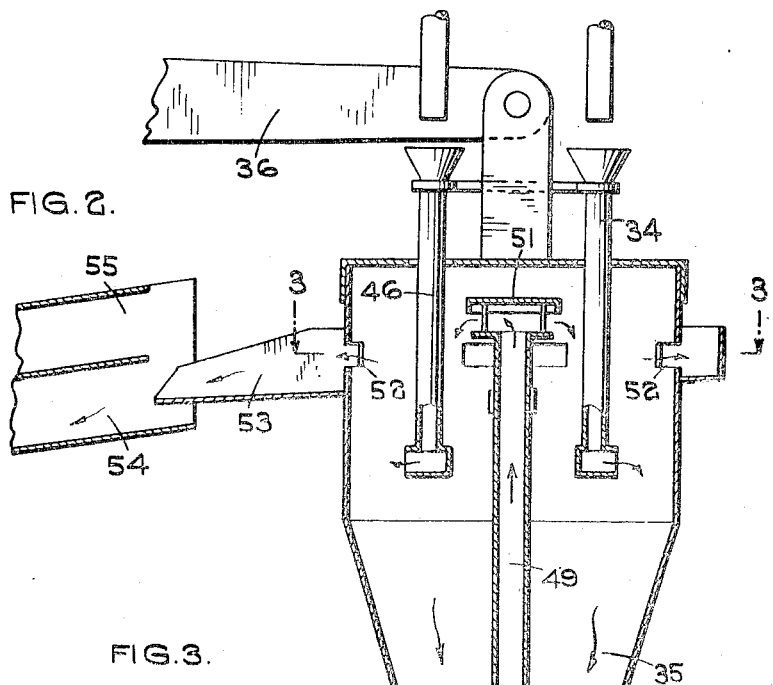
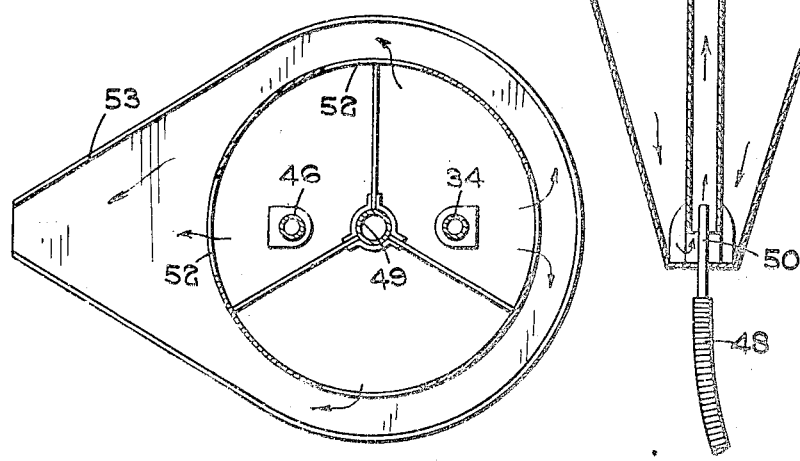
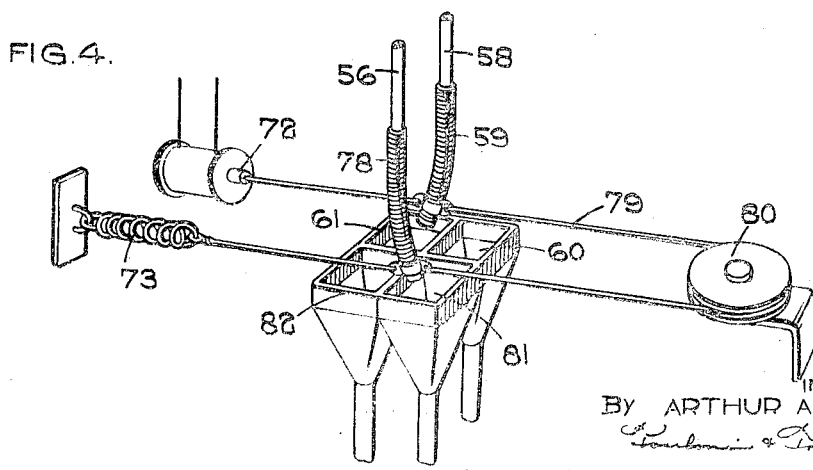

Patented June 1, 1943

2,320,519

UNITED STATES PATENT OFFICE 2,320,519

APPARATUS FOR GRAVITY SEPARATION OF GRANULAR MATERIAL

Arthur Algernon Hirst, Northfield, Birmingham, England, assignor of one-half to Simon-Carves Limited, Cheadle Heath, Stockport, England Application January 7, 1941, Serial No. 373,512
In Great Britain December 30, 1939

12 Claims. (Cl. 209—173)

This invention relates to methods and apparatus for gravity separation of granular material such as coal or ores and of the type in which the granular particles separate according to density in a separating fluid consisting of a suspension of finely comminuted solid in water or other liquid.

Known apparatus of this type has included a separator with or without a reserve or surge tank, the separated products being caused to pass over a screen or screens, of perforated metal, wire cloth or the like, the suspension draining off the separated products without spraying of the latter, being returned either to the separator or to the reserve tank whilst dilute suspension resulting from the spraying of the separated products either with fresh water or with process water, i. e. that obtained from settling tanks and the like, was passed to a dilute suspension tank from which latter the dilute suspension was pumped to a settling cone or other type of thickener provided with outlets for thickened suspension and for liquid wholly or partially clarified.

The primary object of this invention is to provide an improved method enabling the density of the separating suspension in the separator automatically to be maintained substantially constant.

A further object is to provide an improved and simplified apparatus for carrying the improved method into effect.

Referring to the drawings:

Figure 1 shows diagrammatically one arrangement according to this invention.

Figure 2 shows, to an enlarged scale, a part of same.

Figure 3 is a sectional plan view on line 3—3 of Figure 2.

Figure 4 is a perspective view of a modification.

Figure 5:
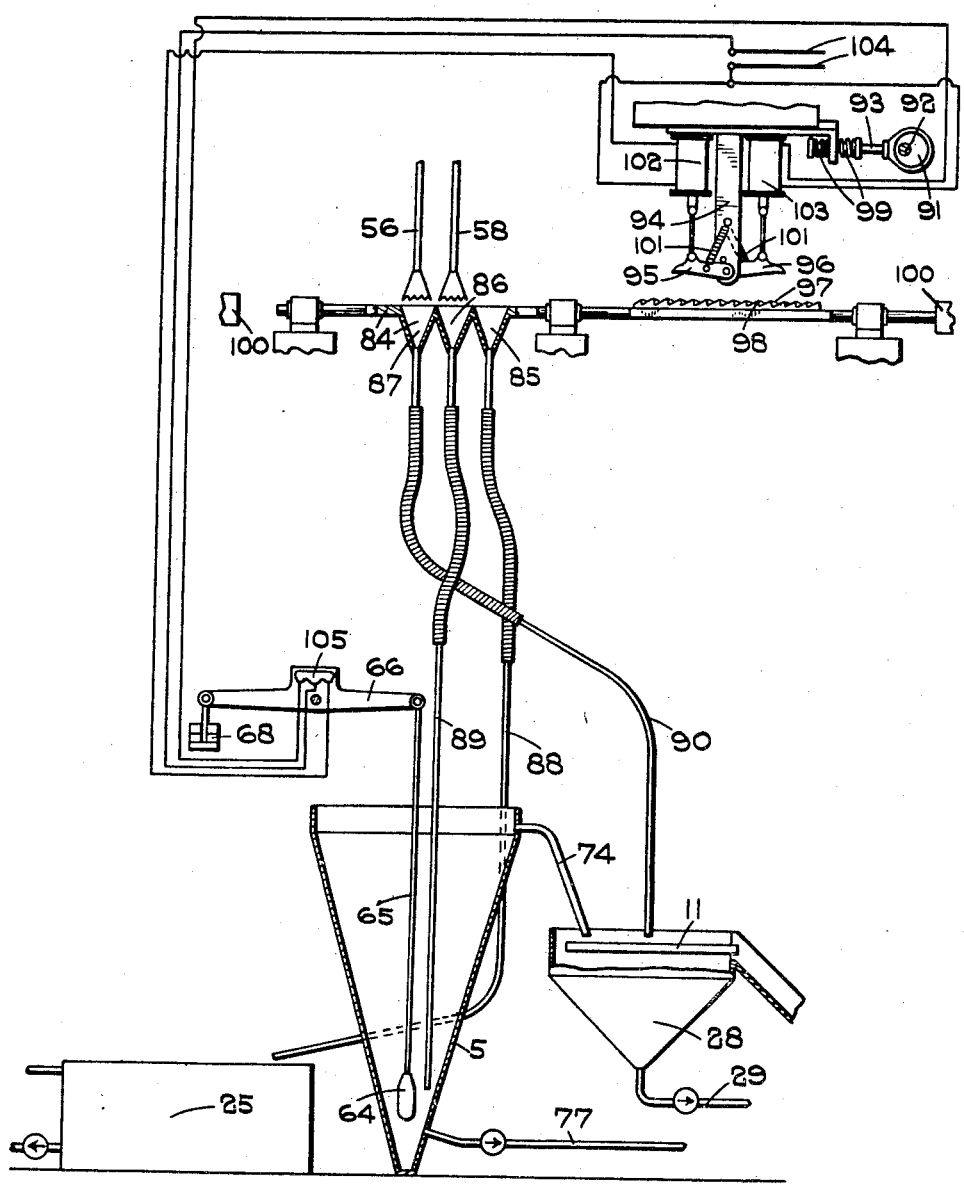
Figure 5 shows diagrammatically a further arrangement.

One form of apparatus according to this invention illustrated in Figures 1 to 3 includes a separator in the form of a relatively shallow vessel or trough 6 provided at each end with a sloping base 7 so that at such ends the depth increases gradually from the end of the separator towards the central portion where the base 8 is either flat or curved.

The separator may be of the form described in either of our applications Nos. 338,131 or 338,132, and is divided by a transverse partition 9 into an inlet compartment on the right of the partition as seen in Figure 1 and an outlet compartment on the left as seen in Figure 1.

A mechanical conveyor includes an endless scraper 12 supported on sprockets 13 and driven by means not shown in the drawings.

The material to be separated, for example, a mixture of coal and dirt or other foreign material, is fed down a chute 14 and is moved by the upper run of the scraper 12 along a horizontal trough 15 to a further chute 16 down which the material passes into the inlet compartment.

Circulating through the separator is a separating fluid comprising a suspension of finely comminuted solid in water, such comminuted solid being hereinafter referred to for the purpose of convenience as sand.

The clean coal, or lighter particles, floating in the suspension in the inlet compartment are removed over a clean coal outlet 17 by a comb conveyor 10 and pass down a chute 18 on to a screen 19, whilst the heavy dirt, sinking in the suspension, is carried beneath the partition 9 by the scraper 12 and is removed by the latter over a dirt outlet 20 and falls on to a screen 21.

The suspension is circulated through the separator and a reserve or surge tank 5, and any suspension removed with the clean coal and dirt is drained from these separated products on the first portion of each of the screens 19 and 21, is collected in vessels 22 and is returned from the latter to the reserve tank by pipes 23.

When merely drained to remove excess suspension, the separated products have accumulations of sand adhering to the separated particles and such products are accordingly subjected to a spraying operation on the screens 19 and 21 to wash away the sand accumulations leaving the separated products relatively clean.

The separated products may be sprayed either with fresh water or as illustrated with process water, i. e. the clarified liquid obtained from settling tanks or the like and pumped to the sprays through pipes 24 from a tank 25. Alternatively, the separated products may be sprayed partly with process water and partly with fresh water; for example, the final clean coal sprays may be supplied with fresh water and the remaining sprays with process water. The dilute suspension resulting from this spraying operation is collected in vessels 26 and passed by pipes 27 to a dilute suspension tank 28 in the form of a relatively small collecting cone or trough.

The dilute suspension passes through a fine mesh slurry screen at the top of the dilute suspension tank 28, this screen operating to remove coarse particles or foreign material separating with the products and removed therefrom during the spraying operation.

Dilute suspension from this tank 28 is pumped through a pipe 29 into the top of a settling cone or thickener 30 having an overflow rim 31 for clarified suspension.

The settling cone functions as a thickener by permitting thickened suspension to accumulate in the lower portion whilst clarified liquid collects in the upper portion and overflows the rim 31.

An overflow pipe 4 leads from the rim 31 to the spray tank 25 but for convenience of illustration this pipe is shown partly broken away.

The thickened suspension passes from the base of the settling cone down a pipe 32 in which is an on-off valve 33A and an interchangeable jet or nozzle 33 and this suspension is delivered into a thickened suspension inlet 34 extending through the top of a conditioning or mixing vessel 35 suspended from one end of a balance arm 36 pivotally supported at 37 and provided at its other end with an adjustable balance weight 38.

The jet or nozzle can be screwed on and off or otherwise readily detachable to enable easy and rapid changing of the size of the jet or nozzle.

Regulation of the discharge of thickened suspension from the cone or thickener is effected by interchanging jets of different internal sizes or bores.

A smaller jet or nozzle results in thicker suspension discharged from the cone or thickener and vice versa.

Clarified liquid from the rim 31 passes down a pipe branched into two pipes 39 and 58 in each of which is a valve 40. At the lower end of the pipe 39 there is a flexible portion 41 to the lower end of which is connected a cable 42, one end of which is anchored to the balance arm 36 whilst the other end carries a weight 43.

As will hereinafter be described the flexible pipe 42 is displaceable to enable delivery of clarified liquid to one or other of two receptacles 44 and 45, the former of which delivers to a clarified liquid inlet 46 extending through the top of the vessel 35, whilst from the receptacle 45 extends a pipe 47 discharging into the tank 25.

Details of the conditioning vessel are shown in Figure 2 from which it will be seen that the vessel has an inverted conical lower portion into the base of which extends a pipe 48 for the supply of compressed air to form an air lift in the vessel for mixing the material and preventing settling of the sand in the conditioning vessel.

A circulating pipe 49 extends centrally through the vessel from a point slightly spaced from the base of the vessel to a point near the top of the vessel approximately at the normal liquid level therein.

The nozzle 50 to which is connected the flexible pipe 48 projects upwardly through the base of the vessel 35 and into the lower end of the circulating pipe 49 and discharge of compressed air through the nozzle 50 forms an air lift up the pipe 49 to circulate the material within the vessel 35.

A baffle 51 is supported above the upper end of the circulating pipe 49.

Slots 52 formed in the wall of the conditioning vessel near the top thereof permit overflow of conditioned suspension from this vessel and such overflow is directed by the spout 53 to one or other of a pair of superposed chutes 54 and 55, the former of which delivers through a pipe 56 into the top of the reserve tank, whilst the chute 55 delivers through a pipe 57 to the dilute suspension tank 28, without going through the slurry screen 11 mounted above this tank.

The branch pipe 58 leading from the rim 31 of the settling cone terminates in a flexible portion 59 for delivering clarified liquid to one or other of two receptacles 60 and 61, discharging respectively through a pipe 62 to the tank 25 and a pipe 63 to the reserve tank 5.

Within the reserve tank 5 is a float 64 mounted on the lower end of a float rod 65 connected to one end of a balance arm 66 pivoted at 67 and provided at its other end with an adjustable balance weight 68.

Mounted on the arm 66 is a switch 69 preferably in the form of a mercury switch for controlling the energisation of a solenoid coil 70 from the supply mains 71.

The flexible pipe 59 is coupled to the slidable core 72 of the solenoid and to a spring 73 which in the unenergised position of the solenoid holds the pipe 59 in the position shown in Figure 1 in which it discharges into the receptacle 60. When the solenoid is energised the core 72 is moved to displace the pipe 59 from this position and against the action of the spring 73 so as to divert the discharge of clarified liquid from the pipe 59 into the receptacle 61.

The reserve tank has an overflow pipe 74 for passing overflow liquid from the reserve tank on to the slurry screen 11 above the dilute suspension tank 28 from which tank it is pumped back to the thickener 30.

An adjustable stop 75 is provided beneath the weight 43 so that the cable 42 is slack for the normal movement of the balance arm 36, becoming taut only when the medium in the vessel 35 becomes greater than a predetermined maximum as hereinafter referred to.

Suspension is returned to the tank 6 from the base of the reserve tank 5 though a pipe 77 in which is a pump 76.

The operation of the apparatus is as follows:

The granular material separated in and removed from the trough 6 is drained on the screens 19 and 21 and the suspension collected in the vessels 22 is passed to the reserve tank 5 to be pumped back to the separator through the pipe 77.

The dilute suspension resulting from the spraying of the separated products is passed to the dilute suspension tank 28 from which it is pumped into the thickener 30 in which the suspension is thickened up to give thickened suspension in the base of the thickener and clarified liquid overflowing to the rim 31.

The size of nozzle 33 is chosen so that thickened suspension leaving the base of the thickener through the pipe 32 is denser than the suspension in the main separator 6 and the density of thickened suspension should normally never become less than that of the suspension in the separator.

Thickened suspension is allowed to flow continuously from the thickener 30 into the conditioning vessel 35 as fast as it is formed in the thickener and without regulation of the volume.

In this way simplification of the system is possible, particularly when more than one cone or thickener is employed, whilst the tendency for the bottom outlet of the cone or thickener to become choked is considerably reduced.

The material in the conditioning vessel is maintained homogeneous by the action of the air lift which is to draw material from the base of the vessel into the lower part of the circulating pipe and force this material up the pipe to discharge it into the top of the vessel.

In Figure 1 the conditioning vessel is shown in its normal position which, by choice of nozzle 33 and the adjustment of the balance weight 38, has been set such that the density of the suspension in the conditioning vessel is at a predetermined figure greater than that of the suspension to be passed to the separator. For example, the predetermined density figure may be approximately 1.5 for an operating density of 1.45 in the separator.

In this position of the conditioning vessel the overflow from the rim 53 passes down the chute 54 and pipe 56 into the reserve tank and the clarified liquid passing down the pipe 39 is directed by the diverter pipe 41 into the receptacle 45 and via the pipe 47 to the spray tank 25.

Adjustment of the density of the suspension to be returned into the separating vessel from the reserve tank is effected by keeping the density of conditioned suspension at the predetermined figure greater than that of the suspension to be passed to the separator and adjusting admission of clarified suspension to the reserve tank through the pipes 58, 59 and 63 in accordance with the indications of the densimetric control comprising the float 64 and the mechanism associated therewith.

In the position shown in Figure 1 the flow of clarified liquid along the pipe 58 is directed by the diverter pipe 59 into the receptacle 60 and passes down the pipe 62 to the spray tank 25, this being the arrangement when the densimetric control indicates a correct or light density in the reserve tank.

If the density of the suspension in the reserve tank rises above the predetermined figure the float 64 rises and the switch 69 on the balance arm 66 is closed to energise the solenoid coil 70 and the pipe 59 is moved to the right as shown in Figure 1 to divert the flow of clarified liquid into the receptacle 61 and thus via the pipe 63 into the reserve tank 5.

Admission of clarified liquid to the reserve tank reduces the density of the suspension in the tank and when this density falls to or below the correct figure the float 64 falls to permit the balance arm 66 to return to its normal position as defined by a stop and the flow of clarified liquid is diverted back to the spray tank 25.

The power required to operate the balance arm to close the switch 69 governs the sensitivity of the control and in order to regulate this sensitivity it is desirable that the balance arm 66 should be provided with a control for varying the sensitivity.

The conditioning vessel is suspended from the balance arm 36 for substantially vertical movement so that so long as the density of the suspension in the vessel 35 is greater than the predetermined figure, which is itself equal to or greater than the operating density in the separator (being say 1.5 for an operating density of 1.45) the conditioning vessel is in the position shown in Figure 1 and the overflow from the vessel 35 is delivered to the reserve tank as above described.

If, however, the suspension in the vessel 35 becomes less dense than the above mentioned predetermined figure the vessel 35 rises and the overflow from the rim 31 is directed to the chute 55 and via the pipe 57 to the dilute suspension tank 28 whence it is returned through the pipe 29 to the thickener 30.

If the suspension in the vessel 35 becomes too dense the vessel falls from the position shown in Figure 1 and this movement tightens the cable 42, which as previously described, is slack for the normal movements of the balance arm, and whilst the overflow from the spout 53 is still delivered down the chute 54 to the reserve tank the diverter pipe 41 is pulled by the cable 42 to the left as seen in Figure 1 and clarified liquid from the rim 31 is delivered to the conditioning vessel until the density has been reduced in the desired manner.

Thus, the conditioned suspension returned to the reserve tank is prevented from becoming so dense as to cause sluggish flow in the circulating pipes, whilst as soon as the density falls below the predetermined minimum figure the flow of suspension from the vessel 35 to the reserve tank is cut off and this suspension is returned via the tank 28 to the thickener 30 to be thickened up.

When the suspension in the vessel 35 has been sufficiently diluted the vessel rises to allow the weight 43 to return to its stop 75 and transfer the flow of clarified liquid to the receptacle 45.

The density of the suspension returned to the reserve tank from the vessel 35 is in this way kept automatically between predetermined limits which, for an operating density of 1.45 might be, for example, 1.5 and 1.7.

This conditioned suspension at a density greater than that of the suspension for the main separation treatment is mixed with the suspension in the reserve tank and the density is adjusted in this reserve tank by adjusting the admission of clarified suspension through the pipe 63 in accordance with the indications of the densimetric control.

If desired the suspension may be circulated within the reserve tank by means of an air lift such as provided in the conditioning vessel 35 or by means of a circulating pipe provided with a pump acting to withdraw suspension from the lower part of the reserve tank and discharge it into the upper part.

With the arrangement described above the control is simplified in that it is necessary to regulate only the flow of clarified liquid and as long as there is sufficient medium in the system and the thickener is working effectively, the reserve tank can be kept full, thus maintaining constancy of pumping.

Further, an indication of insufficiency of medium will be given by the falling level of suspension in the reserve tank.

It may, however, be desirable or convenient to cut off the flow of thickened suspension from the vessel 35 to the reserve tank for the periods during which clarified liquid is being admitted to the reserve tank and for this purpose a simple on-off control such as shown in Figure 4 may be utilised.

In this arrangement the pipe 56 for delivering conditioned or thickened suspension to the reserve tank extends to a position adjacent the diverter pipe 59 for clarified liquid and this pipe 56 is provided with a diverter pipe 78 similar to the pipe 59.

The two diverter pipes are coupled together by a cable 79 passing round a pulley 80 and connected at one end to the solenoid 72 and at the other end to the spring 73.

Beneath the end of the diverter pipe 78 there is arranged a pair of receptacles 81 and 82 similar to the receptacles 60 and 61 below the pipe 59 as already described.

A receptacle 81 is connected by a pipe to the dilute medium tank 28 whilst the receptacle 82 leads to the reserve tank.

In the position shown in the drawings the solenoid is energised to divert the flow of clarified liquid into the receptacle 61 for passage down the pipe 63 to the reserve tank and this movement of the solenoid also diverts the flexible pipe 78 so that the conditioned medium flowing down the pipe 56 is diverted into the receptacle 81 and thence to the dilute medium tank 28 instead of to the receptacle 82 and thence to the reserve tank.

As soon as the densimetric control indicates the correct density the switch 69 is opened to cut off the supply to the solenoid coil 70 and the spring 73 returns both the diverter pipes 59 and 78 to their normal positions in which the pipe 59 directs the clarified liquid via the receptacle 60 to the spray tank 25 whilst the conditioning suspension from the pipe 56 flows via the receptacle 82 to the reserve tank.

In the constructions described above each of the on-off controls, namely, for clarified liquid in Figures 1 to 3 and both for clarified liquid and thickened suspension in Figure 4, is of the continuous flow type including a movable diverter pipe arranged in the flow of liquid or suspension and movable between two positions.

With such a control the flow is not dammed up or impeded since in the "off" position of the control, although the flow is cut off in relation to the reserve tank, this flow is merely diverted to a further tank and recirculated. This is particularly advantageous in the case of the thickened suspension to avoid choking of the system due to accumulations of suspension during the periods when the flow to the reserve tank is cut off.

Such a control is, however, somewhat inflexible in that in the "on" position it permits full flow of liquid or suspension whilst in the "off" position such flow is cut off completely.

The modified control illustrated in Figure 5, however, enables variation in steps from zero to maximum of the flow to the reserve tank both of clarified liquid and of thickened suspension.

The two pipes 56 and 58, for thickened or conditioned suspension and clarified liquid respectively, are arranged side by side each terminating in a fish tail distributor with a serrated lower edge.

Mounted beneath these pipes is a shutter 84 having three side-by-side inverted conical chutes 85, 86 and 87 connected respectively to the spray tank 25, the reserve tank 5 and the dilute suspension tank 28 through pipes 88, 89 and 90 each of which includes a flexible portion.

The shutter 84 is guided in bearings 91 for horizontal sliding movement backwards and forwards beneath the ends of the pipes 56 and 58.

One form of operating mechanism for the shutter includes an eccentric 91 on a power driven shaft 92 arranged to reciprocate endwise in a horizontal direction a rod 93 with which is associated a member 94 carrying a pair of pawls 95 and 96 for engagement one with each of twin ratchet racks 97 and 98 mounted side-by-side on the shutter with the teeth of one rack facing in the opposite direction to the teeth of the other rack.

Compression springs 99 on the rod 93 locate the pawl carrying member 94 resiliently in position relative to the rod 93 so that a yieldable drive is provided for the shutter to prevent the latter straining against the limiting stops 100.

Each pawl is pivoted to the member 94 and is held in an inoperative position clear of its associated rack by a spring 101, each pawl being connected by a link to one of a pair of solenoids 102 and 103 the energising coils of which are adapted selectively to be connected to a pair of supply mains 104 through a two-way mercury switch 105 mounted on the balance arm 66 of the densimetric control including float 64 in the reserve tank 5 as described with reference to Figures 1 to 3. The core of the solenoids 102 and 103 pull downwards when energised so as to engage one or other of the pawls with its corresponding rack.

In the position illustrated, the shutter is in one terminal position engaging the right hand stop 100 and the flow of thickened suspension from the pipe 56 is diverted from the reserve tank to the dilute suspension tank 28, whilst the flow of clarified liquid from the pipe 58 is directed into the reserve tank via the chute 86 and pipe 89.

When the float 64 falls in response to a fall in density in the reserve tank, as a result of the admission of clarified liquid, the balance arm 66 tilts the mercury switch to energise the left hand solenoid 102 so as to move the pawl 95 into engagement with the rack 98 whereupon the reciprocation of the pawl carrier by the eccentric 91 causes the shutter to slide to the left as seen in the drawings.

Such movement takes the chute 86 partly under the distributor of the pipe 56 and partly from under the distributor of the pipe 58. Thus some thickened suspension flows into the reserve tank instead of all flowing to the dilute suspension tank whilst the flow of clarified liquid to the reserve tank is reduced as part of this flow passes down the chute 85 to the spray medium tank 25.

The proportion of thickened suspension to clarified entering the chute 86 depends on the time for which the pawl 95 is held down to engage the rack 98, i. e., upon the period for which the solenoid 102 is energised, this period being governed by the densimetric control.

The rate of reciprocation of the shutter is slow so that after each adjustment there is sufficient time for the conditions within the apparatus to stabilise itself.

When the density of suspension in the reserve tank reaches the predetermined minimum the float 64 rises and the solenoid 102 is de-energised to permit the spring 101 to return the pawl 95 to its inoperative position.

The shutter now remains in its adjusted position, although the pawl carrier and pawls continue to reciprocate under the operation of the eccentric 91, until the densimetric control again indicates an incorrect density in the reserve tank.

If the suspension in the tank 5 becomes too dense, the float 64 rises and tilts the mercury switch in the opposite direction to that in the previous case and the solenoid 103 is operated to move the pawl 96 into engagement with the rack 97 so that the shutter is moved to the right as seen in the drawing. Such movement results in a reduction of the flow of thickened suspension and an increase in the flow of clarified liquid to the reserve tank so as to decrease the density of the resultant suspension in the reserve tank.

In a further construction the arrangements shown in Figures 1 and 5 are combined and the total flow of conditioned suspension from the conditioning vessel is delivered to the reserve tank by the chute 54 and pipe 56 whilst the admission of clarified liquid to the reserve tank is varied in step according to the indications of the densimetric float (64, 105 or 106).

Such a construction includes a conditioning vessel 35 on balance arm 36, this chamber receiving thickened suspension from the cone or thickener 30 and delivering conditioned suspension to the reserve tank via chute 54 and pipe 56 whilst, for the control of the flow of clarified liquid, a shutter such as 84, but omitting the parts 56, 87 and 90, could be used, together with the densimetric float 64, balance arm 66, mercury switch 105, solenoids 102 and 103 and associated part for operating the shutter 84 as previously described with reference to Figure 5.

In operation the total flow of conditioned suspension passes to the reserve tank as described with reference to Figure 1 and the flow of clarified liquid only is controlled by the shutter 84 as described with reference to Figure 5.

Instead of providing a mixing or conditioning chamber as described hereinbefore to guard against the settling tank failing to give sufficiently thickened suspension a densimetric control can be provided operating in a chamber or vessel interposed between the orifice in the base of the settling tank and the chute leading to the mixing device.

This further control, which may be adjusted with bottom control only, that is a mercury switch or the like operating when the float falls, is arranged so that a further pivoted or sliding chute is caused to interrupt the under flow of thickened suspension passing from the settling tank into the chute leading to the mixing device, this further chute diverting the flow either direct to the top of the settling tank or to the dilute suspension tank.

Preferably the further chute is arranged to divert also the clear overflow passing to the mixing device and this clear overflow may be diverted into the spray medium tank.

The mixture normally supplied to the reserve tank as already mentioned is of density slightly greater than that of the primary separating fluid in the separating tank to compensate for variations of density occurring in the separator as would be caused, for instance, by wet screening the feed to the separator, by a leak in the system, say at a pump gland, by the use of sprays to clean the scrapers, particularly the heavy dirt scraper, or by the removal of concentrated accumulations of sand adhering to the heavy dirt or to other separated products. The apparatus functions automatically to mix the thickened suspension and clarified liquid in such proportions as to return back to the separator a suspension either greater than, equal to, or less than the density of the separating suspension according as the latter has been caused to become less than, to remain the same as, or to become greater than that required for separation at the desired density. Accordingly the density of the separating suspension in the separator is automatically maintained constant.

The operating density of the densimetric control may be regulated by varying the effective density of the float by means of the adjustable weights operating on the balance lever as described hereinbefore.

Preferably the float in the densimetric control is mounted on a thin rod so that the submerged volume of the float and rod is substantially constant for all positions of the float.

If the level in the reserve or surge tank falls, though this should never occur in normal operation providing the thickening power of the settling tank is adequate, a visible or audible signal may be given to the operator and an automatic float may be arranged to control the refilling of the settling tank or of the conditioning chamber from a further tank filled with fresh suspension.

The float of the densimetric control need not necessarily be mounted in the reserve tank as described above but may be arranged in any one of a number of alternative positions as follows:

Firstly, it may be arranged in the separator itself, preferably in a position where there is no packing of material to be separated, for example, in the relatively clear zone between the inlet end and the clean coal discharge as indicated in dotted lines at 105 in Figure 1 or in the further relatively clear zone between the adjustable partition and the outlet as also indicated in dotted lines at 106 in Figure 1.

According to a further alternative the densimetric control may be arranged in a special compartment or tank in the feed from the reserve tank to the separator, i. e. in the pipe 77.

When more than one settling cone or thickener is employed or a combination of settling cone or cones with one or more thickeners, the thickened suspension from one or more cones and/or one or more thickeners may be led to the same conditioning chamber. Moreover, thickened suspension may be pumped to the conditioning chamber instead of flowing by gravity.

It should be understood that although a thickener in the form of a settling cone has been described, any other form of thickener could be used. Moreover in types of separator such as that described in our co-pending application No. 338,132, including zones in which suspensions of different densities are employed, the invention may be applied automatically to mix the suspensions abstracted from zones of higher and lower densities to supply to one or other of such zones a suspension of the density required to maintain in such zone a constant separating density.

Finally, in a construction of separator as described in our co-pending application No. 338,132, namely, including one or more pockets in the base of the separator, a densimetric control may be arranged in one or each of a plurality of such pockets.

What I claim then is:

1. Gravity separation apparatus of the type specified including a separating vessel, a thickener for the dilute medium resulting from the spraying of the separated products, a conditioning vessel, means for delivering to said conditioning vessel thickened suspension from said thickener, means for delivering to said separating vessel suspension conditioned in said conditioning vessel, automatically operating means for interrupting said delivery and returning said suspension to the thickener when the density of said suspension falls below that required for delivery to the separating vessel, a counterpoise balance mechanism, means for suspending said conditioning vessel from said mechanism, a discharge conduit leading suspension liquid from said conditioning vessel, superposed chutes arranged to receive liquid from said conduit, the lower chute being associated with means whereby the liquid is conveyed to the separating vessel, and the upper chute leading the liquid back to the thickener, said counterpoise balance mechanism being adjusted so that if the density of the suspension in the conditioning vessel becomes greater than a predetermined minimum the discharge from said conditioning vessel is directed to the separating vessel, whilst if the density of the suspension becomes less than said minimum, said conditioning vessel rises and the discharge therefrom is diverted from the reserve tank.

2. Gravity separation apparatus of the type specified including a separating vessel, a reserve tank, means for circulating separating suspension between said separating vessel and said tank, a thickener for the dilute medium resulting from the spraying of the separated products, a conditioning vessel, means for delivering to said conditioning vessel thickened suspension from said thickener, means for delivering to said reserve tank conditioned suspension from said conditioning vessel, automatically operating means for interrupting said delivery and returning said suspension to the thickener when the density of said suspension falls below that required for delivery to the separating vessel, a counterpoise balance mechanism, means for suspending said conditioning vessel from said mechanism, said mechanism being adjustable for variation of the counterbalance of the mechanism in accordance with the predetermined minimum figure for the density of the suspension in the conditioning vessel, an overflow spout near the upper end of said conditioning vessel, superposed chutes arranged to receive suspension discharged from said spout, a lower one of said chutes leading to the reserve tank and receiving conditioned suspension with a density greater than said predetermined minimum, an upper one of said chutes leading back to the thickener and receiving suspension discharged from said conditioning vessel at a density less than said predetermined minimum.

3. Gravity separation apparatus of the type specified including a separating vessel, a reserve tank, means for circulating separating suspension between said separating vessel and said tank, a thickener for the dilute medium resulting from the spraying of the separated products, a conditioning vessel, means for delivering to said conditioning vessel thickened suspension from said thickener, means for delivering to said reserve tank conditioned suspension from said conditioning vessel, automatically operating means for interrupting said delivery and returning said suspension to the thickener when the density of said suspension falls below that required for delivery to the separating vessel, a replaceable nozzle in the flow of thickened suspension from said thickener to said conditioning vessel for adjustment of the said flow and of the degree of thickening in said thickener, a counterpoise balance mechanism, means for suspending said conditioning vessel from said mechanism, said mechanism being adjustable for variation of the counterbalance of the mechanism in accordance with the predetermined minimum figure for the density of the suspension in the conditioning vessel, an overflow spout near the upper end of said conditioning vessel, superposed chutes arranged to receive suspension discharged from said spout, a lower one of said chutes leading to the reserve tank and receiving conditioned suspension with a density greater than said predetermined minimum, an upper one of said chutes leading back to the thickener and receiving suspension discharged from said conditioning vessel at a density less than said predetermined minimum and control means for regulating the admission of clarified liquid to the reserve tank to enable control of the density of the suspension returned to the separating vessel, said control means including a balance arm, a float rod on one end of said arm, a densimetric float on said float rod, an adjustable counterpoise on the other end of said arm, said float being immersed in suspension and mounted for movement to control the operation of electric switch means and electromagnetically operated devices controlled by said switch means for regulating liquid flow to said reserve tank.

4. Gravity separating apparatus for separating granular materials having substantially the specific gravity of coal by means of a medium of suspension composed of solid particles and a liquid, comprising a washing screen, a thickener, a separating tank, means for delivering the medium of suspension from said separating tank to said washing screen, means for delivering a diluted liquid medium from the washing screen to the thickener, means for discharging the overflow and the underflow from said thickener, mixer means, means for mixing in said mixer means the underflow with a portion of the overflow from said thickener to obtain a mixture which is of greater density than the medium of suspension in the separating tank, means for controlling delivery of the overflow into said mixer in accordance with the density of the mixture in said mixer, including means for diverting the mixture as it comes from the mixer to said thickener when it becomes less than the desired density, and means for returning the mixture to the separating tank after the correct density has been secured.

5. Gravity separating apparatus for separating granular materials having substantially the specific gravity of coal by means of a medium of suspension composed of solid particles and a liquid, comprising washing means, a thickener, a separating tank, means for delivering the medium of suspension from said separating tank to said washing means, means for delivering a diluted liquid medium from said washing means to the thickener, means for discharging the overflow and the underflow from said thickener, mixer means, means for mixing in said mixer means the underflow with a portion of the overflow from said thickener to obtain a mixture which is of greater density than the medium of suspension, automatic means for controlling delivery of the overflow into said mixer in accordance with the density of the mixture in said mixer, including automatic means for diverting the mixture as it comes from the mixer to said thickener when it becomes less than the desired density, and means for returning the mixture to the separating tank after the correct density has been secured.

6. Gravity separating apparatus for separating granular materials having substantially the specific gravity of coal by means of a medium of suspension composed of solid particles and a liquid comprising a separating tank, a thickener, means for delivering the medium of suspension from said separating tank to the thickener, means for discharging the overflow and the underflow from said thickener, mixer means, means for mixing in said mixer means the underflow with a portion of the overflow from said thickener to obtain a mixture which is of greater density than the medium of suspension in the separating tank, automatic means for controlling delivery of the overflow into said mixer in accordance with the density of the mixture in said mixer, including means for diverting the mixture as it comes from the mixer to said thickener when it becomes less than the desired density, and means for returning the mixture to the separating tank after the correct density has been secured.

7. Gravity separating apparatus for separating granular materials having substantially the specific gravity of coal by means of a medium of suspension composed of solid particles and a liquid, comprising a separating tank, a thickener, and spraying means, for delivering the medium of suspension from said separating tank to said spraying means, means for delivering a diluted liquid medium from the spraying means to the thickener, means for discharging the overflow from the underflow to said thickener, mixer means, means for mixing in said mixer means the underflow with a portion of the overflow from said thickener to obtain a mixture which is of greater density than the medium of suspension in the separating tank, automatic means for controlling the delivery of the overflow into said mixer in accordance with the density of the mixture in said mixer, including automatic means for diverting the mixture as it comes from the mixer to said thickener when it becomes less than the desired density, and means for returning the mixture to the separating tank after the correct density has been secured.

8. Gravity separating apparatus for separating granular materials having substantially the specific gravity of coal by means of a medium of suspension composed of solid particles and a liquid, comprising a washing screen, a thickener, a separating tank and a reserve tank, means for delivering the medium of suspension from said separating tank to said washing screen, means for delivering a diluted liquid medium from the washing screen to the thickener, means for discharging the overflow and the underflow from said thickener, mixer means, means for mixing in said mixer means the underflow with a portion of the overflow from said thickener to obtain a mixture which is of greater density than the medium of suspension in the separating tank, means for controlling delivery of the overflow into said mixer in accordance with the density of the mixture in said mixer, including means for diverting the mixture as it comes from the mixer to said thickener when it becomes less than the desired density, means for returning the mixture to the separating tank after the correct density has been secured, and means for delivering to said reserve tank conditioned suspension from said mixer.

9. A method of gravity separation for granular materials having substantially the specific gravity of coal by means of a medium of suspension of solid and liquid, including the steps of leading away from a separation vessel a medium of suspension, diluting said medium of suspension, thickening the diluted medium within a thickener, discharging the overflow and underflow from the thickener, mixing the underflow with a portion of the overflow to obtain a mixture which is of greater density than the medium in the separating vessel, controlling the delivery of the overflow into a mixing vessel in accordance with the density of the mixture, diverting the mixture to the thickener when it becomes of less density than desired and returning the mixture to the separating vessel after proper density has been secured.

10. A method of gravity separation for granular materials having substantially the specific gravity of coal by means of a medium of suspension of solid and liquid, including the steps of leading away from a separation vessel a medium of suspension, screening and diluting said medium of suspension, thickening the diluted medium within a thickener, discharging the overflow and underflow from the thickener, mixing the underflow with a portion of the overflow to obtain a mixture which is of greater density than the medium in the separating vessel, controlling the delivery of the overflow into a mixing vessel in accordance with the density of the mixture, diverting the mixture to the thickener when it becomes of less density than desired and returning the mixture to the separating vessel after proper density has been secured.

11. A method of gravity separation for granular materials having substantially the specific gravity of coal by means of a medium of suspension of solid and liquid, including the steps of leading away from a separation vessel a medium of suspension, screening said medium of suspension, thickening the screened medium within a thickener, discharging the overflow and underflow from the thickener, mixing the underflow with a portion of the overflow to obtain a mixture which is of greater density than the medium in the separating vessel, controlling the delivery of the overflow into a mixing vessel in accordance with the density of the mixture, diverting the mixture to the thickener when it becomes of less density than desired and returning the mixture to the separating vessel after proper density has been secured.

12. A method of gravity separation for granular materials having substantially the specific gravity of coal by means of a medium of suspension of solid and liquid, including the steps of leading away from a separation vessel a medium of suspension, diluting said medium of suspension, thickening the diluted medium within a thickener, discharging the overflow and underflow from the thickener, mixing the underflow with a portion of the overflow to obtain a mixture which is of greater density than the medium in the separating vessel, controlling the delivery of the overflow into a mixing vessel in accordance with the density of the mixture and returning the mixture to the separating vessel after proper density has been secured, but interrupting the return of the mixture to the separating vessel and diverting said mixture to the thickener when the density of the mixture falls below the desired density, again discharging the overflow and underflow from the thickener, mixing the underflow with a portion of the overflow to obtain a mixture which is of greater density than the medium in the separating vessel and returning the mixture to the separating vessel after proper density has been secured.

ARTHUR ALGERNON HIRST.